United States Patent [19]

Körner et al.

[11] Patent Number: 4,623,134

[45] Date of Patent: Nov. 18, 1986

[54] HYDRAULIC ACCUMULATOR FOR PROVIDING PRESSURIZED FLUID

[75] Inventors: Gerhard Körner, Schriesheim; Edelwald Lutz, Rodgau; Horst Plettner, Hanau, all of Fed. Rep. of Germany

[73] Assignee: Raychem Corporation, Menlo Park, Calif.

[21] Appl. No.: 810,822

[22] Filed: Dec. 16, 1985

Related U.S. Application Data

[63] Continuation of Ser. No. 527,572, Aug. 29, 1983, abandoned.

[30] Foreign Application Priority Data

Aug. 28, 1982 [DE] Fed. Rep. of Germany ....... 3232074

[51] Int. Cl.[4] ......................... F16F 9/18; H01H 35/38

[52] U.S. Cl. ................................ 267/124; 200/82 R; 200/82 B; 267/128

[58] Field of Search ............... 267/121, 124, 128, 162, 267/126; 200/82 R, 82 B, 82 C; 138/31; 92/130 C; 60/413, 417; 425/DIG. 1

[56] References Cited

U.S. PATENT DOCUMENTS

| | | | |
|---|---|---|---|
| 1,365,030 | 1/1921 | Flentje | 188/322.15 X |
| 1,512,736 | 10/1924 | Aldrich | 138/31 |
| 2,321,093 | 6/1943 | Lupfer | 138/31 |
| 3,064,093 | 11/1962 | Jansson et al. | 200/82 B |
| 3,960,209 | 6/1976 | Neubrand | 267/162 X |
| 4,077,303 | 3/1978 | Poulsen | 92/130 C X |

FOREIGN PATENT DOCUMENTS

| | | | |
|---|---|---|---|
| 1290226 | 3/1969 | Fed. Rep. of Germany | 200/82 B |
| 1603420 | 11/1981 | United Kingdom | 188/322.15 |

*Primary Examiner*—Bruce H. Stoner, Jr.
*Assistant Examiner*—Robert J. Oberleitner
*Attorney, Agent, or Firm*—Edith A. Rice; Herbert G. Burkard

[57] ABSTRACT

A hydraulic accumulator for providing pressurized fluid for a hydraulic system, includes a cylinder, a piston movably disposed in the cylinder defining a space in the cylinder on one side of the piston for pressurized fluid, and a mechanical spring device connected to the piston for generating pressure in the pressurized fluid.

3 Claims, 4 Drawing Figures

HYDRAULIC ACCUMULATOR FOR PROVIDING PRESSURIZED FLUID

This application is a continuation of application Ser. No. 527,572, filed Aug. 29, 1983, now abandoned.

The invention relates to a hydraulic accumulator for providing pressurized fluid for a hydraulic system, especially for actuating a medium or high-voltage circuit breaker, including a cylinder, a piston movable in the cylinder, pressurized fluid located on one side of the piston, and a spring device acting on the piston for generating pressure in the pressurized fluid.

Hydraulic accumulators of the above-mentioned type which serve for providing pressurized fluid, such as hydraulic oil, have become known in the art for a hydraulic control system for controlling or actuating a high-voltage circuit breaker.

Hydraulic accumulators are used which are constructed as vessels and have diaphragms inside the vessels. On one side of the diaphragm is pressurized fluid and on the other side, is gas. The gas is placed under pressure and since it is compressible as compared to the pressurized fluid, it acts as a gas compression spring for generating pressure in the pressurized fluid. In high-voltage switching installations in particular, a piston is provided instead of a diaphragm. The piston is disposed so as to be movable back and forth in the interior of the vessel, which is in the form of a cylinder. In the last-mentioned hydraulic accumulators, nitrogen ($N_2$) is generally used as the gas. Utilizing the gas as a gas compression spring, has advantages inasmuch as the pressure in the gas and therefore also the pressure in the pressurized fluid, can be held approximately constant by suitable replenishment. However, since gas must be replenished or refilled in principle, the expense, which is reflected in the operating costs, is relatively high. In addition, special measures must also be taken to prevent gas from penetrating to the pressurized fluid side, vice versa to prevent pressurized fluid from penetrating to the gas side and also to prevent the pre-tensioned gas from escaping into the atmosphere. If the temperature changes, the diaphragm or the piston can shift in the vessel so that a correspondingly large quantity of pressurized fluid must be provided and kept under pressure, to ensure that a sufficient supply of pressurized fluid for the hydraulic control system is ensured even at low temperatures.

It is accordingly an object of the invention to provide a hydraulic accumulator for providing pressurized fluid, which overcomes the hereinafore-mentioned disadvantages of the heretofore-known devices of this general type. Such a hydraulic accumulator should also be of simple construction.

With the foregoing and other objects in view there is provided, in accordance with the invention, a hydraulic accumulator for providing pressurized fluid for a hydraulic system, especially for actuating a medium or high-voltage circuit breaker, comprising a cylinder, a piston movably disposed in the cylinder defining a space in the cylinder on one side of the piston for pressurized fluid, and a mechanical spring device connected to the piston for generating pressure in the pressurized fluid. In accordance with another feature of the invention, the mechanical spring device is in the form of coil, cup or spiral springs.

In accordance with a further feature of the invention, the mechanical spring device is in the form of at least one spiral spring, and including a drive pinion connected to the spiral spring, a roll connected to the drive pinion, and a pulling or tension band or tape connected from the piston to the roll for winding the band on the roll when the spiral spring rotates the drive pinion. In accordance with an added feature of the invention, there is provided a piston rod connected between the piston and the band.

The spring force of such spiral springs does not remain constant over the entire spring travel. For this reason, in accordance with an additional feature of the invention, the roll is a cam having a surface on which the band is wound with a shape providing substantially constant tension on the piston through the band regardless of force changes in the spring during winding of the band. In this way, the force on the piston remains constant even if the spring force of the spiral springs is changed when being wound on the roll. In accordance with again another feature of the invention, there are provided means connected to the band for providing substantially constant tension on the piston by equalizing force changes in the spring during winding of the band on the roll.

In accordance with again a further feature of the invention, the band is a chain and the cam is a sprocket wheel.

In accordance with again an added feature of the invention, there is provided a deflection roll for the band disposed between the cam and the piston and having a rim, the band being extended along an imaginary line coaxial with the axis of the piston and tangent to the rim of the deflection roll.

In accordance with again an additional feature of the invention, the spring device is in the form of a plurality of tension or compression springs, such as coil or cup springs, evenly distributed about the periphery of the hydraulic accumulator, instead of spiral springs.

In accordance with yet another feature of the invention, there are provided rocking levers each being pivotable in the vicinity of the center thereof and having one end engageable by a respective one of the compression springs and another inner end for acting on the piston.

The mechanical relationship of the rocking lever to the screws and the piston, likewise achieves equalization of torques due to the fact that the effective leverage of the rocking lever is decreased or increased according to the position of the springs or the tension condition of the springs caused by rocking the rocking levers.

In accordance with yet a further feature of the invention, the rocking levers are substantially perpendicular to the central axis of the piston and are rotatable in a plane extending through the axis of the piston.

In accordance with yet an added feature of the invention, there is provided a support integral with the piston having a support surface thereon, at least the inner end of the rocking lever having a substantially semicircular contact cam surface resting against the support surface.

In accordance with yet an additional feature of the invention, there is provided a base plate on which the cylinder is fastened, a cross piece spaced at a distance from the base plate, connecting bolts connected from the cross piece to the base plate, and a piston rod connected to the piston, the cylinder, piston and piston rod being accomodated between the base plate and the cross piece, and the rocking levers being pivotably supported on the cross piece.

In accordance with still a further feature of the invention, the cylinder has a low pressure space therein integral with the space for pressurized fluid of the hydraulic system, and including a piston rod connected to the piston, extended through the low pressure space and having a free end, the support being in the form of a contact ring disposed on the free end of the piston rod, and the support surface being substantially perpendicular to the central axis of the piston rod.

In accordance with a concomitant feature of the invention, there is provided a piston rod connected to the piston, and a relief valve at least partly disposed in the cylinder, the cylinder having a wall surface and the cylinder having a low pressure space on the other side of the piston in vicinity of the piston rod, the low pressure space being connected to the space for the pressurized fluid by opening the relief valve when the piston comes to a stop against the wall surface of the cylinder.

The particular advantages of the hydraulic accumulator according to the invention are that changes of the pressure in the pressurized fluid which can occur in gas pressure accumulators because of gas leaks and the temperature dependence of the gas, can be prevented. Thus, the amount of pressurized fluid need not be larger than necessary and additional expenses, which are necessary for maintaining the gas pressure, such as devices for replenishing the gas in the event of a leak, can also be omitted. Provision need only be made for sufficient tightness against the escape of pressurized fluid, but no measures need be taken to prevent gas from penetrating into the pressurized fluid. The hydraulic accumulator according to the invention is therefore clearly more cost-effective than a gas-pressure hydraulic accumulator.

Other features which are considered as characteristic for the invention are set forth in the appended claims.

Although the invention is illustrated and described herein as embodied in a hydraulic accumulator for providing pressurized fluid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 2:
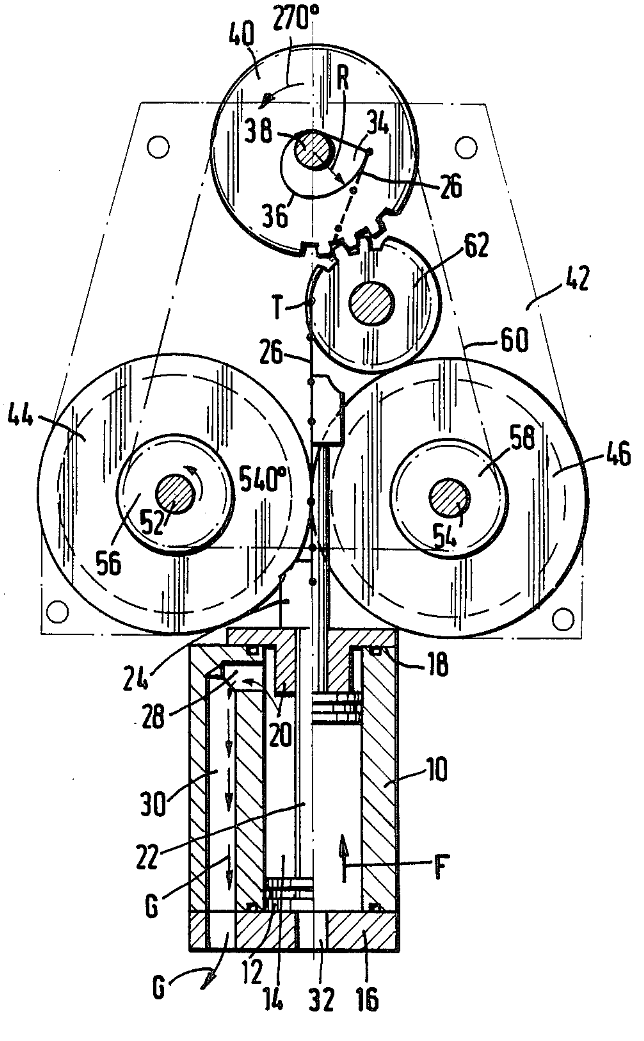
FIG. 2 is a cross-sectional view taken along the line II—II in FIG. 1, in the direction of the arrows.

Referring now to the figures of the drawing in detail, and first particularly to FIG. 2 thereof, there is seen a cylinder arrangement 10 and a piston 12 which can be moved between two end positions in the interior of the cylinder 10. To the left of the center line in FIG. 2, the piston 12 is shown with the cylinder completely filled, and to the right of the center line, the piston 12 is shown with the cylinder completely empty. The space 14 above the piston is the space which takes up the pressurized fluid. Toward the bottom, the cylinder is closed off by means of a cover 16 and toward the top, it is closed off by means of a further cover 18 in a pressure-proof manner. The further cover 18 has an annular extension 20 which protrudes into the interior of the space 12 and which serves for limiting the travel of the piston 12. A piston rod 22 which is attached to the upper surface of the piston, is brought to the outside through the annular extension 20 and the further cover 18. An extension 24 is attached to the outer end of the piston rod 22, and a chain or band 26 is fastened to the extension. The chain 26 is constructed like a bicycle chain and has several chain links. In vicinity of the annular extension 20, the cylinder 10 has an outlet 28 formed therein which leads to a passage 30 extending parallel to the central axis of the cylinder; this passage also extends through the cover 16. A further opening 32 is provided in the central region of the cover 16. If oil is needed by the hydraulic system which is connected at the passage 30, the oil that is under the pressure of the piston 12 which is acted upon in the direction of the arrow F and is in the space 14, is pressed in the direction of the arrow G through the outlet 20 and the passage 30 toward the hydraulic system. The piston 12 is, of course, guided tightly in the interior of the cylinder, and a respective seal is provided between each of the covers 16 and 18 and the cylinder 10. It does not matter in this case how the individual elements are held together; they may be coupled to each other by means of flange connections or other fastening elements, for instance.

The free end of the chain 26 is fastened to a roll in the form of a cam 34, the radius R of which becomes smaller in spiral-fashion as the cam rotates, so that a curved surface 36 is formed, the purpose of which will be explained below. The cam 34 is fastened to a drive shaft 38 which is coupled to a sprocket wheel or drive pinion 40. This wheel 40 is supported together with the drive shaft 38 on a base plate 42.

Spiral spring packets 44, 46 and 48, 50 (also seen in FIG. 1) which act on two shafts 52 and 54, are supported between the drive shaft 38 and the gear 40. Gears 56 and 58 (seen in FIG. 2) are fastened on the shafts 52 and 54. A driving chain 60 is looped around the gears 56 and 58 and the gear 40. Instead of a driving chain 60, a serrated belt or the like can also be used.

The periphery of the gear 62 is tangent to the extension of the center line of the piston rod 22 in such a manner, that in the region between a tangential point T and the point of engagement of the chain 26 with the piston rod, the chain 26 is always exactly aligned in the direction of the piston rod.

Figure 1:
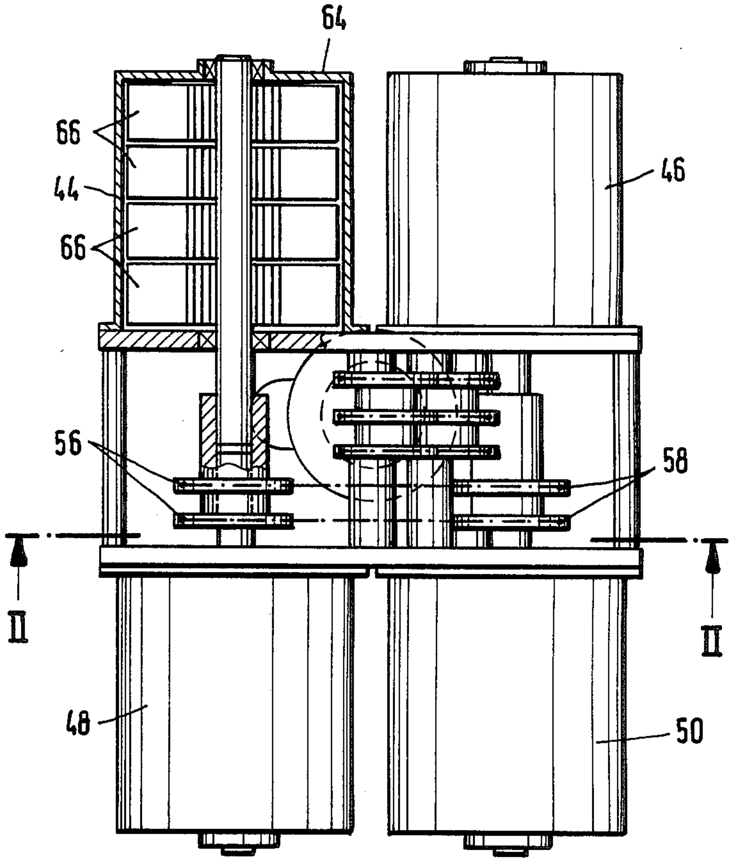
FIG. 1 is a diagrammatic top plan view of a first embodiment of a hydraulic accumulator according to the invention.

It will be seen from FIG. 1 that two pairs of gears are provided; consequently, two drive chains 60 are also provided. The spiral spring packets 44, 46, 48 and 50 are each enclosed by a respective housing 64, in which four spiral springs 66 are accomodated. Two of the springs act on each of the shafts 52 and 54.

If pressurized oil is removed, then the spiral springs pass on their force to the drive chain 60, so that the gear 40 is rotated and the chain 26 is wound on the curved surface 36. Accordingly, the curved surface 36 may also have teeth which fit the chain 60 or the spacings of the links of the chain.

When the spiral springs have given off a certain amount of energy, their spring force will change in accordance with the spring characteristic of the spiral springs. This change of the spring force can be compensated by the cam 36. When the chain 26 is wound on the curved surface 36, the radius of the point of impingement of the force of the chain 26 and therefore also the torque acting on the chain 26 as well as the driving force for the piston, is changed. Through suitable construction of the cam 36, a driving or pulling force which is constant in every position of the piston, and therefore an approximately constant pressure in every position of the piston, can be generated.

Figure 3:
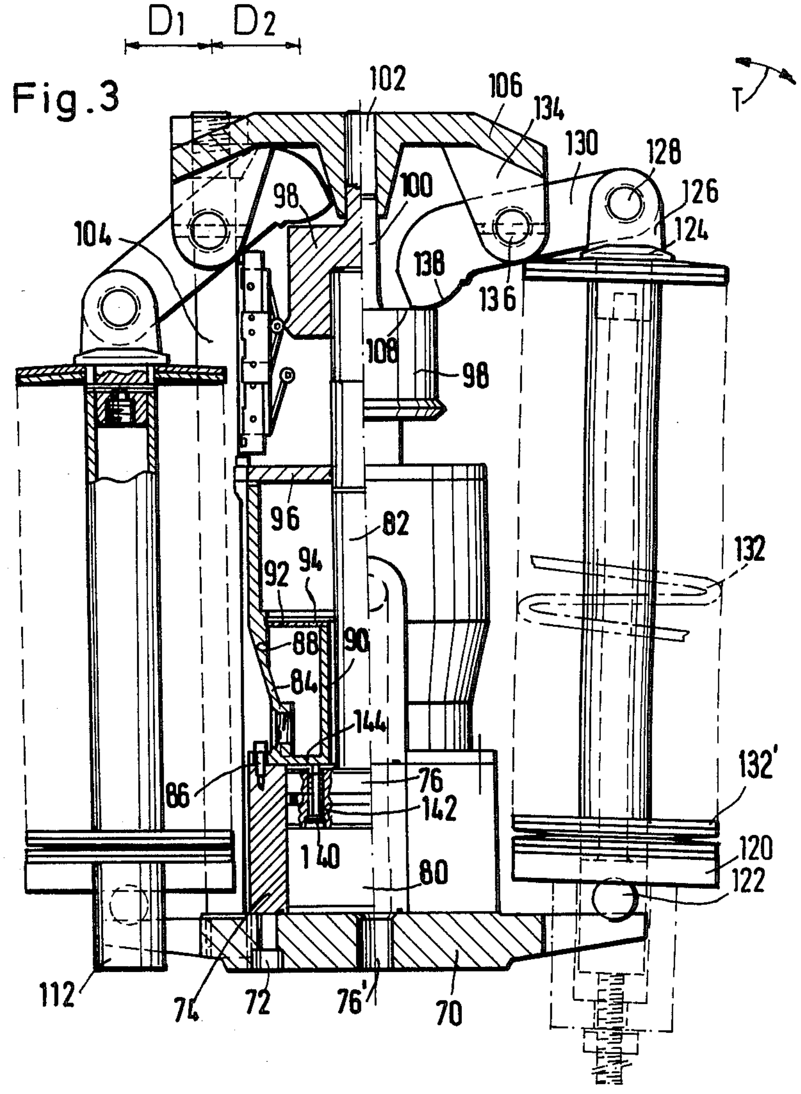
FIG. 3 is a partially cross-sectional side elevational view of a second embodiment of a hydraulic accumulator according to the invention.

FIG. 3 shows a further embodiment of the invention. A tubular cylinder 74 is bolted to a base plate 70 by means of screw connections 72. A piston 76 can be moved back and forth in the interior of the cylinder 74. The base plate 70 has an outlet opening 76' formed therein which is connected to the hydraulic system. Between the base plate 70, the cylinder 74 and the piston 76 there is a high-pressure space 80. A piston rod 82 is fastened to the piston 76 on the side of the piston opposite the high-pressure space. A vessel 84 which has an outer wall 88 and an inner wall 90, is fastened by means of a screw connection 86 to the end face of the cylinder opposite the base plate 70. The inner wall 90 covers only approximately half of the outer wall 88. At the exposed end, i.e., in the central region, the inner wall 90 is covered by means of a cover 92 with a passage opening 94. The outer wall 88 is closed toward the top by means of a terminating cover 96. A space formed by the inner wall 90 and the outer wall 88 contains so-called damping oil at low pressure, while foamed oil at low pressure is provided outside the cover 92 but still within the space formed by the outer wall 88 and the cover 96. The piston rod 82 is sealed and extends through the cover 96. A support ring 98 is firmly attached at the upper end of the piston rod 82, such as by means of a screw connection. On the side opposite the piston rod, the support ring 98 has a post 100 which is guided in a cross piece 106 that is firmly connected to the base plate 70 by means of bolts 104. A radially extending contact surface 108 is provided at the support ring 98.

Figure 4:
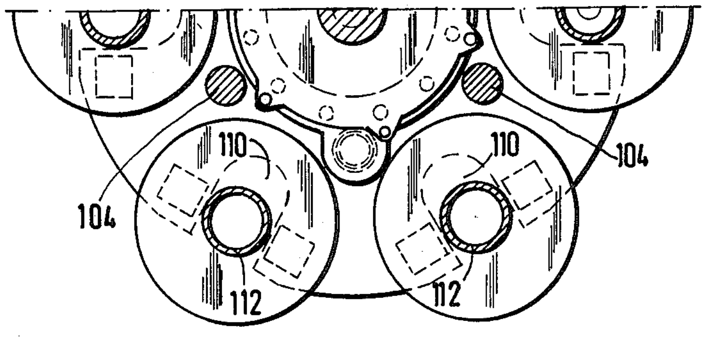
FIG. 4 is a partial bottom plan view of the hydraulic accumulator according to FIG. 3.

As seen in FIG. 4, the base plate 70 has cutouts 110 formed therein which are distributed over the circumference thereof and serve for the passage of a tube 112. A support plate 120 is supported on the base plate and above the base plate by means of two bearing bolts 122.

A boss 124 is provided at the upper end of the tube or rod 112. A strap 126 is attached to the boss 124 and a pin 128 extends through the boss 124 and is linked to a two-armed lever 130. A cup spring packet formed of a number of cup springs 132, is disposed between the boss 124 and the plate 120. It can be seen from FIG. 4 that a total of six such cup spring structures and six two-armed levers 130 are disposed at the circumference of the device.

The two-armed lever 130 is movably supported on an extension 134 through a shaft 136 on the crosspiece 106. The inner end of the two-armed lever has a spherical formation 138 which rests on the surface 108. The plate or boss 124 is movable relative to the plate 120, so that the cup springs 132' or coil springs 132 shown in phantom can be compressed (as shown toward the left of the center line in FIG. 3) or decompressed (as shown toward the right of the center line in FIG. 3). The cup spring packets 132 can be rotated in the direction of the double arrow T due to their support in the bearing bolts 122, as can be seen from the disposition of the two cup springs toward the left and right of the central axis. In the position at the left, a distance D1+D2 is shown which is relatively small and in the position at the right, this distance has been increased, so that the torque caused and generated by the cup springs on the ring 98 is increased. In the fully tensioned condition, this torque is approximately as great as in the decompressed condition, so that the pressure exerted on the ring 98 remains approximately constant even if the spring force decreases.

As already mentioned, the structure to the left of the center line is in the tensioned condition, i.e., the piston is in the position wherein the accumulator is completely filled with pressurized fluid. If pressurized oil is tapped off or removed through the opening or the passage 76' in a switching action or in a control action in the hydraulic control system, the piston moves downward under the pressure of the springs 132, so that the cup spring packets swing outward about the pin 128 at their upper ends. Due to the enhanced lever action, the reduction of the spring pressure is compensated upon further decompression, so that the pressure in the fluid is kept approximetely constant by the lever action of the two-armed lever 130.

Instead of several cup spring packets, coil springs can also be used; it is, of course, also possible to use only a single coil spring. However, the single coil spring must be made large enough and in addition, it is also necessary to provide a support plate in the upper region which accomodates the entire arrangement and which then acts on the angle levers 130 but cannot be movably connected to the screw.

A relief valve 140 which penetrates the piston 76 with a valve rod 142 and protrudes beyond the piston 76 on the side opposite the high-pressure space 80, is accomodated in the piston 76. If the piston 76 is pushed by the pressurized fluid into the uppermost position, such as due to an overload in the hydraulic control system, the valve rod 142 comes to a stop against a limiting surface 144 at the low-pressure container 84, 88, 90 and 96 and opens the relief valve 140, so that a relief passage from the high-pressure space 80 to the low-pressure space is provided.

We claim:

1. Hydraulic accumulator for providing pressurized fluid for a hydraulic system, comprising a cylinder, a piston movably disposed in said cylinder defining a space in said cylinder on one side of said piston for pressurized fluid, a mechanical spring device being in the form of a plurality if compression springs evenly distributed about the periphery of the hydraulic accumulator and connected to said piston for maintaining pressure in the pressurized fluid in said space, rocking levers each being pivotable in vicinity of the center thereof and having one end engaging a respective one of said compression springs and another inner end acting on said piston and permanently transfering motion of said compression springs to said piston for maintaining a constant pressure in the pressurized fluid, said rocking levers being substantially perpendiclar to the longitudinal axis of said piston and rotatable in a plane extending through the axis of said piston, a support integral with said piston having a support surface thereon, at least said inner end of said rocking lever having a substantially semicircular contact cam surface resting against and rolling on said support surface for equalizing changes in the force of said compression springs and maintaining pressure in the pressurized fluid for each position of said piston, a base plate on which said cylinder is fastened, a cross piece spaced at a distance from said base plate, connecting bolts connected from said cross piece to said base plate, and a piston rod connected to said piston, said cylinder, piston and piston rod being accomodated between said base plate and said cross piece, and said rocking levers being pivotably supported on said cross piece.

2. Hydraulic accumulator according to claim 1, wherein said cylinder has a low pressure spaced therein integral with said space for pressurized fluid, said piston rod being, extended through said low pressure space and having a free end, said support being in the form of a contact ring disposed on said free end of said piston rod, and said support surface being substantially perpendicular to the axis of said piston rod.

3. Hydraulic accumulator according to claim 1, including a relief valve at least partly disposed in said cylinder, said cylinder having a wall surface and said cylinder having a low pressure space on the other side of said piston in vicinity of said piston rod, said low pressure space being connected to said space for the pressurized fluid by opening said relief valve when said piston comes to a stop against said wall surface of said cylinder.

* * * * *